M. W. JACOBI.
BAKER'S OVEN.
APPLICATION FILED MAR. 1, 1913.

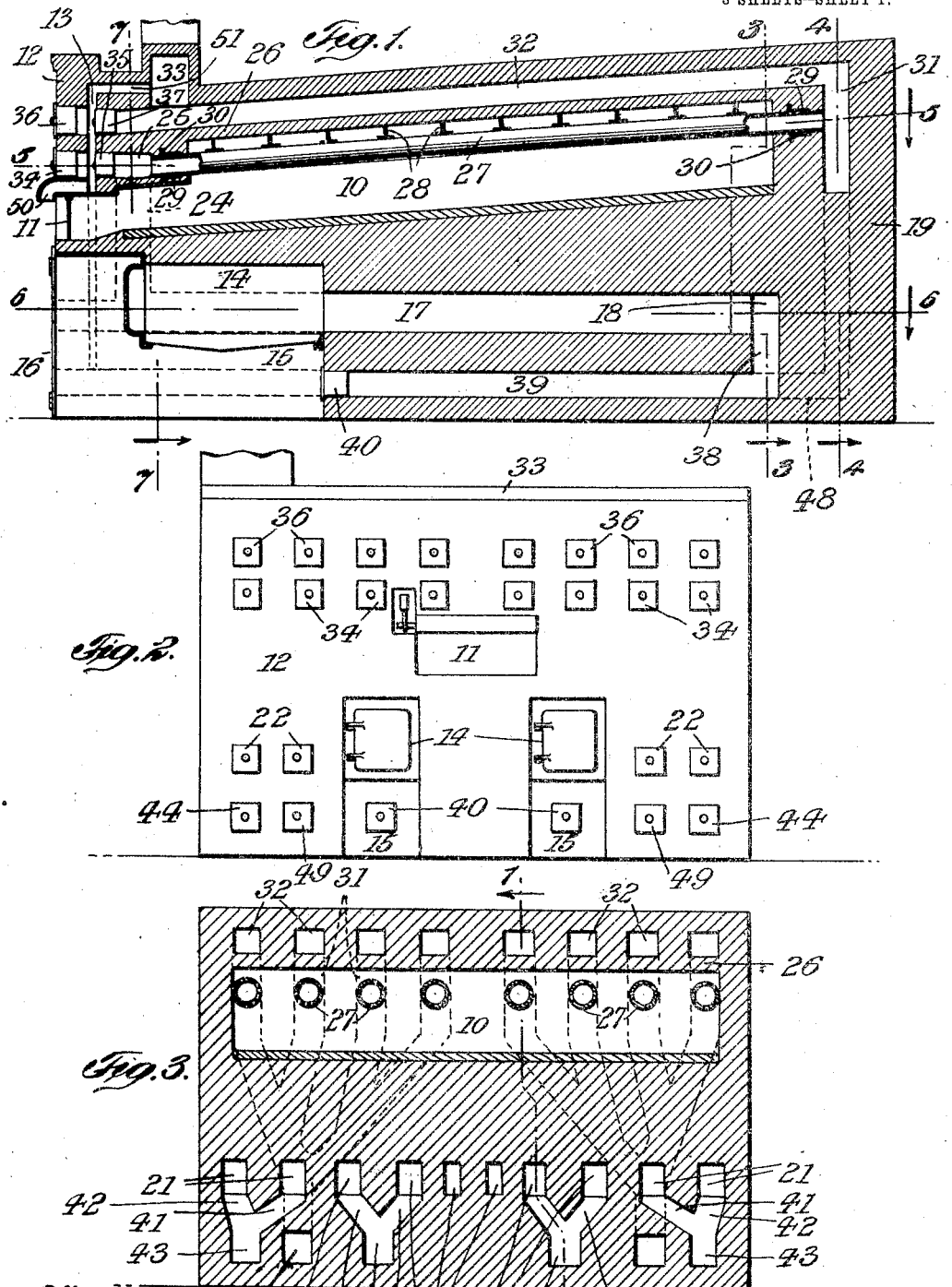

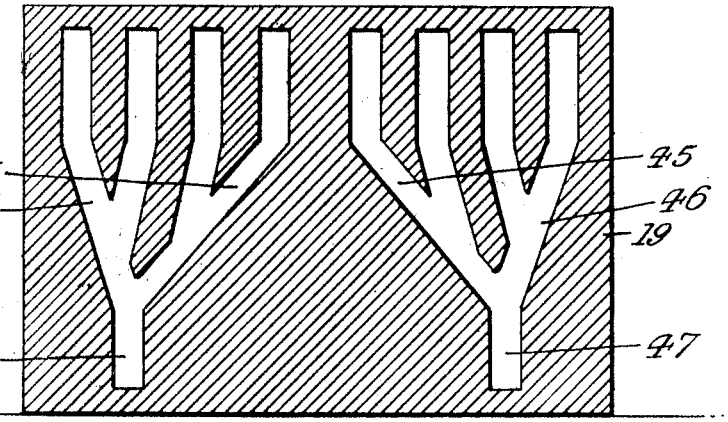
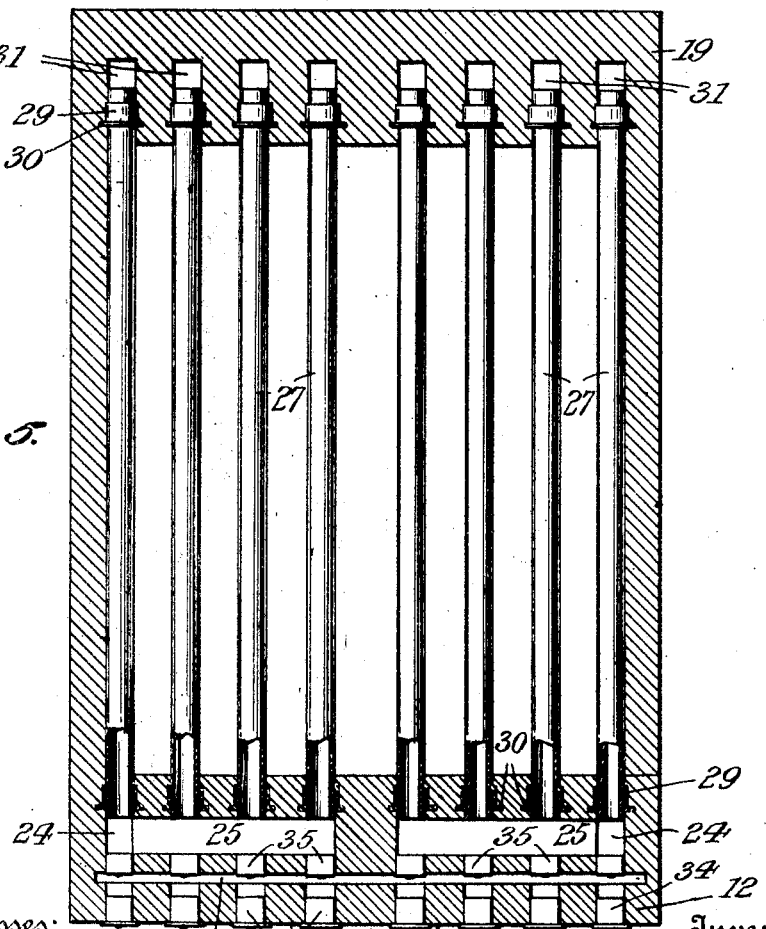

1,097,229.

Patented May 19, 1914.
3 SHEETS—SHEET 3.

Witnesses:
Inventor
Morris W. Jacobi
By his Attorneys

UNITED STATES PATENT OFFICE.

MORRIS W. JACOBI, OF WEEHAWKEN HEIGHTS, NEW JERSEY.

BAKER'S OVEN.

1,097,229.  Specification of Letters Patent.  Patented May 19, 1914.

Application filed March 1, 1913. Serial No. 751,393.

*To all whom it may concern:*

Be it known that I, MORRIS W. JACOBI, a citizen of the United States, residing at Weehawken Heights, county of Hudson, and State of New Jersey, have invented a new and Improved Baker's Oven, of which the following is a specification.

This invention relates to a baker's oven of novel construction, which possesses superior heating qualities, may be readily freed from soot, and carries off the steam emitted from the baking chamber into the bakery, so that the atmosphere of the latter is greatly improved.

Figure 6:
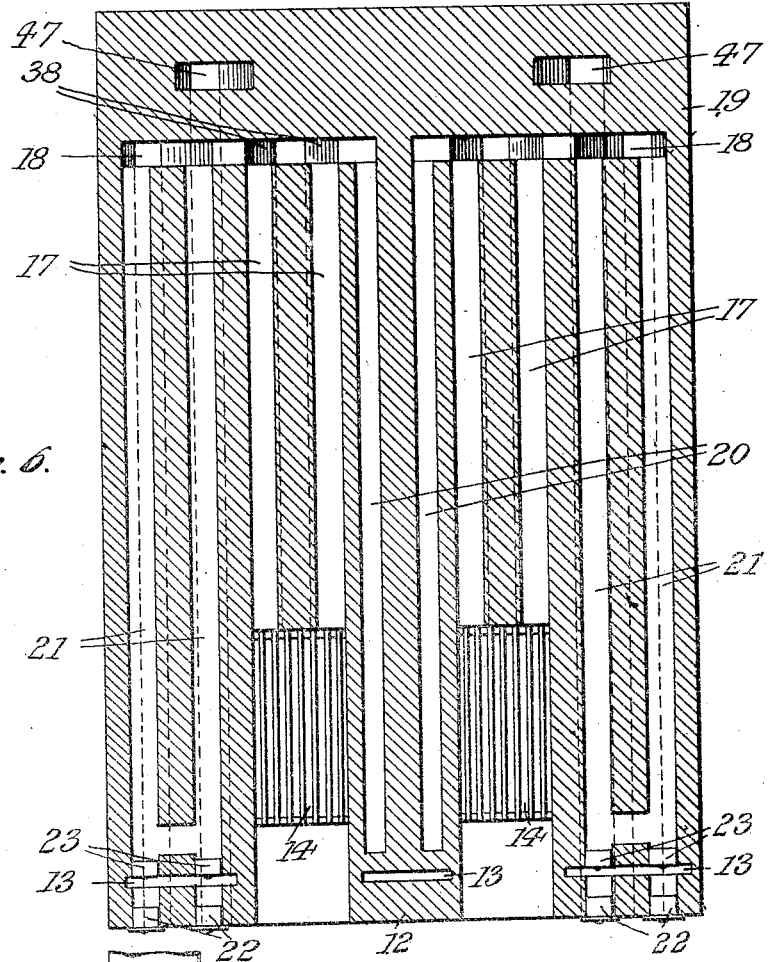
Figure 7:
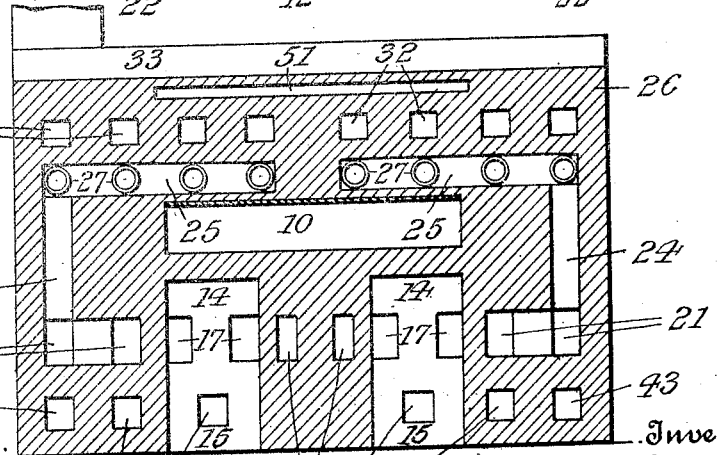

In the accompanying drawing: Figure 1 is a longitudinal section on line 1—1, Fig. 3, of a baker's oven embodying my invention; Fig. 2 a front elevation thereof with the ash pit doors omitted; Fig. 3 a cross section on line 3—3, Fig. 1; Fig. 4 a cross section on line 4—4, Fig. 1; Fig. 5 a longitudinal section partly in view, on line 5—5, Fig. 1; Fig. 6 a longitudinal section on line 6—6, Fig. 1, and Fig. 7 a cross section on line 7—7, Fig. 1.

The baking chamber 10 of the oven is shown to be accessible through a centrally disposed door 11 hung in the front wall 12, which may be provided with dead air spaces 13. Below the oven sole are shown to be arranged two systems of tortuous heating flues, which receive the heating gases from a pair of fire chambers 14 located at the front of the oven, though the invention is equally applicable to ovens having rear fire chambers. The fire chambers 14 are arranged on the right and left side of the oven respectively, each fire chamber being provided with an ash pit 15, the fire chamber and pit being accessible through door 16. From each fire chamber, there extends rearwardly a pair of heating flues 17 that communicate with a transverse flue 18 formed in the rear oven wall 19. The inner end of flue 18 communicates with a dead flue 20 disposed below the center of the baking chamber, while the outer end of flue 18 communicates with a pair of flues 21 disposed along the side walls of said chamber. The heating gases travel from fire chamber 14 backward through flues 17 and thence divide within transverse flue 18, part entering the central flue 20, while the main body thereof flows forward through the outer or flanking flues 21, so that in this way the sole of the baking chamber is thoroughly heated. The front ends of the outer flues 21 are accessible through outer and inner plugs 22, 23, fitted into front wall 12, forward and backward of dead air space 13 respectively. The front ends of each pair of flues 21 communicate with a common uptake 24 built into front wall 12, the two uptakes in turn communicating with transversely disposed distributing chambers 25 formed in wall 12 directly beneath the roof 26 of baking chamber 10. Into this chamber, enter the forward ends of a plurality of longitudinally arranged heating pipes 27 located directly beneath the girders 28 supporting roof 26. Pipes 27 are supported by the front and rear oven walls 12, 19 into which walls are tightly fitted tubular sleeves 29 having flanges 30 by means of which the sleeves are anchored. Each pipe 27 is snugly encompassed at each of its ends by one of the sleeves 29, which while forming a reliable and tight bearing for the pipe, permits its free expansion and contraction. Furthermore, the flanges 30 which circumferentially encompass the sleeves and are set back from the ends thereof, form tight joints between the sleeves and the supporting oven walls, which prevent the escape of heat and steam from the baking chamber, through the body of said walls, whenever they become defective in course of time. The rear ends of pipes 27 communicate with upright ducts 31 built into the rear oven wall 19 and extending a distance above and below such pipes. The upper ends of ducts 31 communicate with the rear ends of a plurality of longitudinally arranged heating flues 32 built into the oven directly above the roof 26 of the baking chamber and communicating at their forward end with a transverse chimney passage 33. It will be seen that by the construction described, the heating gases rise from flues 21 through uptakes 24 into distributing chambers 25, flow rearward through pipes 27, upward through ducts 31, and thence forward through flues 32 to be finally discharged from the chimney. In this way the baking chamber is subjected to both bottom and top heat in a most thorough and uniform manner. Access to pipes 27 may be obtained by outer and inner plugs 34, 35, while access to flues 32 may be had by outer and inner plugs 36, 37.

Means are provided for readily segregating the soot accumulating in the heating flues and pipes and which may be pushed back from time to time along said flues and pipes after first removing the plugs. For the purpose of removing the soot from the lower flues 17, each transverse flue 18 communicates opposite the rear ends thereof, by two converging branches 38 with the rear end of a gallery 39, which extends longitudinally through the oven from the back toward the front thereof and is located below the level of flues 17. The front end of each gallery 39 enters the back of ash pit 15 and is normally closed by a plug 40. For removing the soot from the outer flues 21, each transverse flue 18 communicates opposite the ends thereof with two converging branches 41, 42 of a downwardly extending substantially Y-shaped duct opening into the rear end of a soot gallery 43 located in a plane beneath the lower heating flues which likewise extends longitudinally through the oven and is arranged preferably on the same level with galleries 39. Of these branches, the inner branch 41 has a pronounced outward deflection for the purpose of carrying gallery 43 well toward the outer side of the oven. The forward end of gallery 43 is adapted to be closed by a plug 44. For removing the soot from the upper pipes 27 and flues 32, the lower ends of each set of rear upright ducts 31 open into the two branches 45, 46 of a downwardly extending Y shaped duct 47, the inner branch having a more pronounced dip than the outer branch, so as to carry duct 47 toward the outer side of the oven. Duct 47 opens into the rear end of a longitudinally arranged soot gallery 48 accommodated between ash pit 15 and gallery 43 and adapted to be closed by a plug 49.

It will be seen that by the means described, each of the rear flues is tapped at a plurality of points by the Y shaped branches of the rear upright soot ducts, which thus collect the soot along the entire length of such rear flues, and cause the same to be massed within the several longitudinally extending soot galleries. As these galleries open into the ash pits and into the oven front sidewise of the ash pits, the soot may be readily removed from the oven front, such removal being in no wise hindered by building a battery of ovens closely side by side.

When the door of the baking chamber is opened while the baking is going on, a considerable volume of steam issues therefrom into the bakery to the great discomfort of the operator. In order to abate this nuisance, I provide directly above the oven door 11, a sheet metal hood 50 that projects some distance beyond the front wall 12. This hood extends with its downwardly directed mouth directly above the opening of the baking chamber, so that upon opening door 11, the escaping steam will have a tendency to rise into the hood from whence it escapes through a by pass 51 into the chimney.

I claim:

1. A baker's oven, comprising a baking chamber, a plurality of heating flues extending above and below said chamber, transverse rear flues into which the heating flues open, sets of downwardly extending soot ducts tapping the transverse flues at various points, said ducts converging from their upper toward their lower ends, where they merge into each other, a plurality of longitudinally arranged soot galleries that communicate at their rear ends with the soot ducts, while their front ends open into the oven front, and plugs for closing said ducts.

2. A baker's oven, comprising a baking chamber, a plurality of heating flues extending above and below said chamber, transverse rear flues into which the heating flues open, sets of downwardly extending soot ducts tapping the transverse flues at various points, said ducts converging from their upper toward their lower ends, where they merge into each other, a plurality of longitudinally arranged soot galleries, that communicate at their rear ends with the soot ducts, fire chambers having ash pits and located at the oven front, some of the soot galleries opening into said ash pits, while the other soot galleries open into the oven front, and plugs for closing the last named soot galleries.

MORRIS W. JACOBI.

Witnesses:
FRANK V. BRIESEN,
KATHERYNE KOCH.